United States Patent
Park et al.

(10) Patent No.: US 7,212,685 B2
(45) Date of Patent: May 1, 2007

(54) METHOD FOR PROCESSING IMAGE DATA OF OPTICAL MOUSE

(75) Inventors: Keun-Woo Park, Seoul (KR); Jong-Sik Jeong, Seoul (KR); Kyoung-Joong Min, Yongin-si (KR); Kang-ju Kim, Jeollanam-do (KR); Byoung-Won Hwang, Seoul (KR); Won-Tae Choi, Suwon-si (KR)

(73) Assignee: Samsung Electro-Mechanics Co., Ltd., Kyunggi-Do (KR)

(*) Notice: Subject to any disclaimer, the term of this patent is extended or adjusted under 35 U.S.C. 154(b) by 792 days.

(21) Appl. No.: 10/414,668

(22) Filed: Apr. 16, 2003

(65) Prior Publication Data

US 2004/0091165 A1 May 13, 2004

(30) Foreign Application Priority Data

Nov. 12, 2002 (KR) ............................ 2002-70144

(51) Int. Cl.
*G06K 9/40* (2006.01)
*G09G 5/08* (2006.01)
*H04B 1/66* (2006.01)

(52) U.S. Cl. .................. 382/260; 345/163; 375/240.16

(58) Field of Classification Search ............... 382/260, 382/275–276, 313, 285, 305; 250/559.32; 235/472.03, 472.01; 348/669, 699; 345/156, 345/157, 163, 166; 375/240.16
See application file for complete search history.

(56) References Cited

U.S. PATENT DOCUMENTS 4,631,400 A * 12/1986 Tanner et al. ............... 250/221
4,686,329 A * 8/1987 Joyce ....................... 178/19.01
5,598,187 A * 1/1997 Ide et al. ..................... 345/158
6,392,632 B1 * 5/2002 Lee ............................ 345/158
6,513,717 B2 * 2/2003 Hannigan ............... 235/462.45
6,568,777 B1 * 5/2003 Anderson et al. ............... 347/9

FOREIGN PATENT DOCUMENTS

KR 102010048830 8/2001

* cited by examiner

Primary Examiner—Kanjibhai Patel
(74) Attorney, Agent, or Firm—Gottlieb, Rackman & Reisman, P.C.

(57) ABSTRACT

Disclosed herein is a method for processing image data of an optical mouse. In the method for processing image data of an optical mouse, direction and size values of motion vectors which are image data consecutively inputted from an image pixel array are filtered with respect to X and Y axes by a filter. A predetermined number of motion vectors converted by and outputted from the filter are accumulated, and the accumulated values are mapped to conversion values to attenuate noise components and amplify directionality of the motion vectors depending on a speed of the optical mouse by a mapper. The values mapped by the mapper in a plurality of pipes are stored, and a value obtained by adding the plural stored values to each other and dividing the added result value by a conversion factor is transmitted to a personal computer (PC) interface such as a Universal Serial Bus (USB) or PS/2. Accordingly, the present invention is advantageous in that it minimizes noise components of the optical mouse, and consequently ensures the unnatural movement of a cursor on a PC screen.

8 Claims, 8 Drawing Sheets

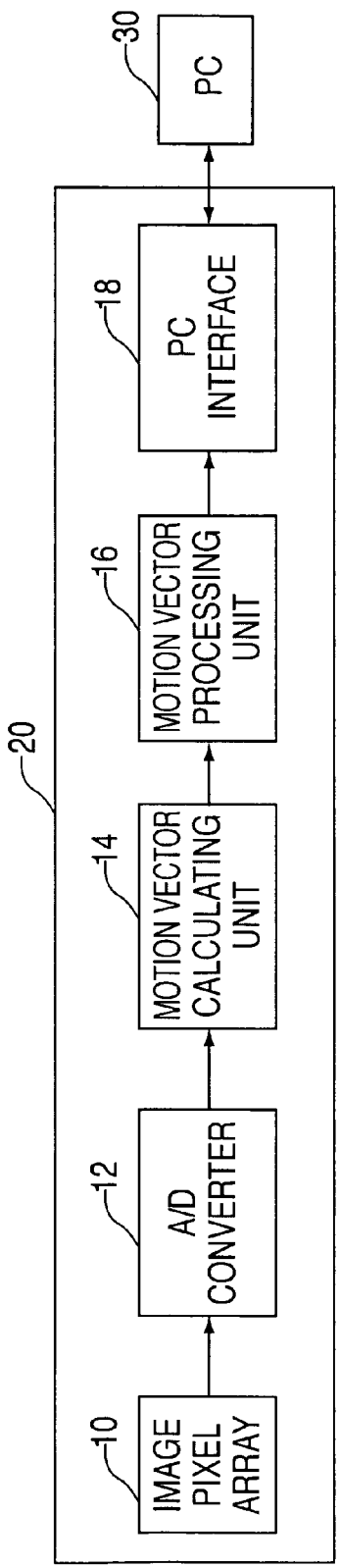
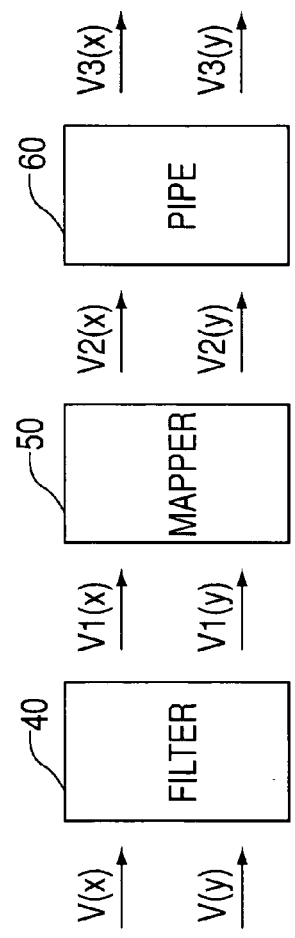
FIG. 3
FIG. 4

METHOD FOR PROCESSING IMAGE DATA OF OPTICAL MOUSE

BACKGROUND OF THE INVENTION

1. Field of the Invention

The present invention relates generally to optical mice, and more particularly to a method for processing image data of an optical mouse, which obtains an improved trajectory curve of a pointer of the optical mouse.

2. Description of the Prior Art

FIG. 1 is a block diagram of an image processing circuit of a conventional optical mouse.

The optical mouse image processing circuit 5 comprises an image pixel array 1, an analog circuit for controlling the image pixel array 1, an analog/digital converter 2, a motion vector (motion or movement coordinates of the optical mouse) calculating unit 3, and a personal computer (PC) interface 4 for interfacing with a PC 6.

The image-pixel array 1 extracts values, obtained by the reactions of the pixels when the pixels react to light according to the movement of the mouse, from the pixels. In this case, an image pixel array consisting of 18*18 (324) pixels each with a size of 53 µm*53 µm is used as an example of the image pixel array 1.

Values outputted from the image pixel array 1 are analog values, so a process of converting the analog values into digital values using the analog/digital converter 2 is required. In this case, pixel data corresponding to 18*18 pixels of the image pixel array 1 are not simultaneously inputted to the analog/digital converter 2, but sequentially inputted thereto one by one and then converted from analog to digital values. The converted digital values for respective pixels can be represented by 4-bit or 8-bit data according to the resolution of the analog/digital converter 2.

The motion vector calculating unit 3 is used to calculate motion vectors. A process of calculating the motion vectors is described. First, 11*11 image data of 18*18 pixel image data are used as a reference frame. In this case, 18*18 image data of a previous frame are stored in a buffer. If a next frame is inputted to the buffer, 11*11 image data of the next frame are compared with the 11*11 image data of the previous frame while the 11*11 image data of the next frame move, thereby calculating motion vectors. At this time, through a process of reducing each of the 18*18 image data of the previous frame stored in the buffer into 1-bit data, 17*17 image data remain. If the 11*11 image data of the next frame is compared with 11*11 image data of the reference frame, the displacement of a difference therebetween is within a range of −3 to 3 for a reference time interval, and the value of each of motion vectors is one of −3, −2, −1, 0, 1, 2 and 3.

The motion vector values determined by the above process are read every set time, and are enumerated continuously, thus determining a trajectory of the optical mouse. In this case, only if a difference between consecutive values varies rapidly, a motion vector is recognized as an error and adjusted to a correct value. Therefore, if data whose directions vary are temporarily inputted, the motion vectors cannot be effectively adjusted, so the trajectory of the optical mouse is unnaturally represented on a monitor in many cases. For example, if motion vector values are inputted as 030, "0" represents a motionless state of the mouse, and "3" represents a sudden motion thereof. However, a sudden motion cannot occur for a short time interval, so "3" is recognized as an error and is compulsorily adjusted to "0" to improve the movement of the mouse. However, if it is determined that the mouse moves left and motion vectors are mistakenly calculated even though the mouse actually moves right (positive direction), for example, if motion vector values are "0 (−1) 0", the motion vectors cannot be recognized as errors because the motion vector values do not represent a sudden variation. Therefore, in many cases, the trajectory of the mouse becomes unnatural. Such data errors are generated due to the imprecision of analog processing at a part of the optical mouse which reads data. These data errors can be clearly seen by referring to a trajectory of a mouse pointer, obtained when a rectangle is drawn by the optical mouse in FIG. 2a, and a trajectory of the mouse pointer, obtained when a circle is drawn by the optical mouse in FIG. 2b.

SUMMARY OF THE INVENTION

Accordingly, the present invention has been made keeping in mind the above problems occurring in the prior art, and an object of the present invention is to provide a method for processing image data of an optical mouse, which outputs image signals inputted from an image pixel array of the optical mouse to a personal computer (PC) through a motion vector processing algorithm, thus providing a trajectory curve of the optical mouse with improved curved trajectory features.

In order to accomplish the above object, the present invention provides a method for processing image data of an optical mouse, which outputs values obtained by filtering, mapping, and piping motion vectors (movement coordinates of the optical mouse; in case of the optical mouse, the movement coordinates thereof are calculated from the variations of voltage values outputted from an image pixel array which reacts according to the amount of light reflected by a surface under the optical mouse to indicate luminance of the surface) with respect to X and Y axes to a PC through an interface, thus minimizing noise components of the optical mouse.

That is, the present invention provides a method for processing image data of an optical mouse, comprising the steps of filtering the motion vectors which are image data consecutively inputted from an image pixel array with respect to X and Y axes by a filter according to the direction and size, accumulating a predetermined number of motion vectors converted by and outputted from the filter, and mapping the accumulated values to conversion values to attenuate noise components and amplify directionality of the motion vectors depending on a speed of the optical mouse by a mapper; and storing the values mapped by the mapper in a plurality of pipes, and transmitting a value obtained by adding the plural values to each other which are stored in a plurality of pipes and dividing the added result value by a conversion factor to a personal computer (PC) interface such as a Universal Serial Bus (USB) or PS/2.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a block diagram of an image processing circuit according to the present invention;

FIG. 4 is a block diagram showing a procedure of processing motion vectors according to the present invention;

DESCRIPTION OF THE PREFERRED EMBODIMENTS

Figure 1:
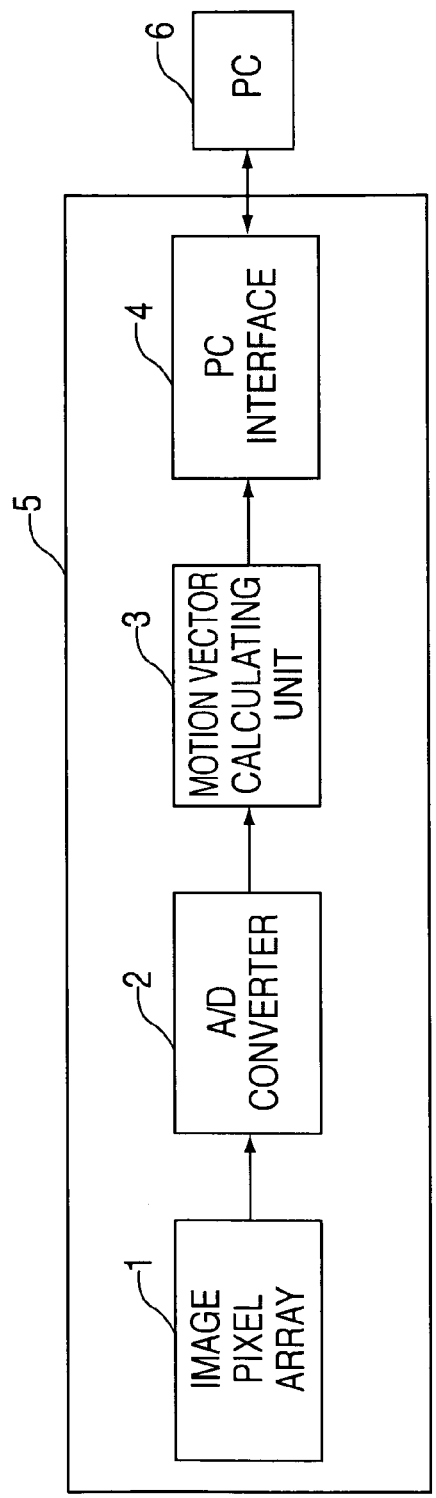
FIG. 1 is a block diagram of an image processing circuit of a conventional optical mouse.

Hereinafter, embodiments of the present invention will be described in detail with reference to the attached drawings.

FIG. 3 is a block diagram of an image processing circuit according to the present invention, and FIG. 4 is a block diagram showing a procedure of processing motion vectors, wherein a procedure performed by a motion vector processing unit 16 of FIG. 3 is divided into three stages and depicted.

Image data from an image pixel array 10 are outputted at regular intervals (in this case, 588μ sec). Since the image data are analog signals, they are converted into digital signals by an analog/digital converter 12. The converted digital image data are inputted to a motion vector calculating unit 14. The motion vector calculating unit 14 calculates motion vectors using the digital image data. The motion vectors are processed while passing through a filter 40, a mapper 50 and a pipe 60 of the motion vector processing unit 16. Processed results through the motion vector processing unit 16 are transmitted to a PC 30 through a PC interface 18, so a trajectory of a mouse pointer with excellent curved features can be obtained. Preferably, an image processing circuit 20 of the optical mouse is included in an integrated circuit (IC) for the optical mouse.

Next, a method of processing image data V(x) through respective operating stages performed by the filter 40, the mapper 50 and the pipe 60 is described in detail.

Figure 5:
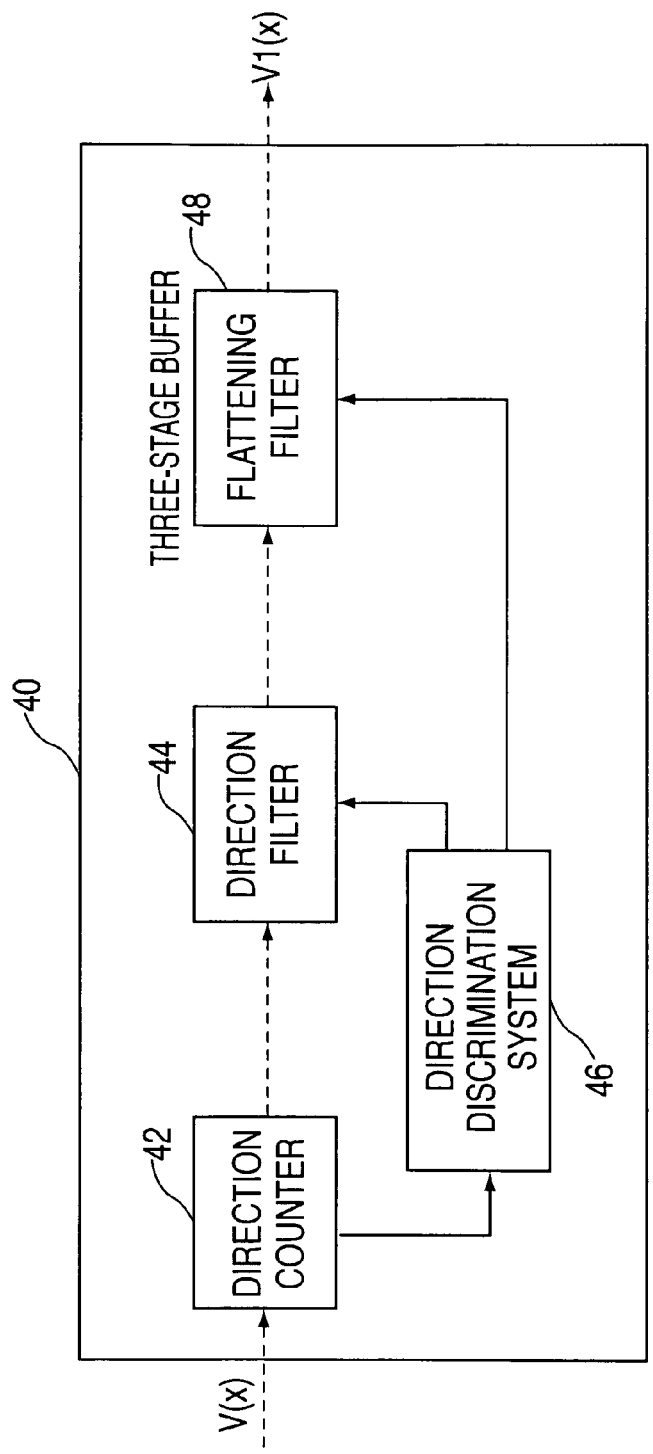
FIG. 5 is a block diagram showing the construction of a filter of the present invention.

First, the configuration of the filter 40 is depicted in FIG. 5. A direction counter 42 accumulates direction values of a set of motion vectors V(x). If a positive (+) value is inputted to the direction counter 42 once, the counted value of the direction counter 42 is "1" in a positive direction. If a positive (+) value is inputted twice, the counted value thereof is "2", and if a positive (+) value is inputted three times, the counted value thereof is "3". Further, if a negative (−) value is inputted to the direction counter 42, the counted value of the direction counter 42 is "1" in a negative (−) direction. If a value "0" (for example, V(x)) is consecutively inputted ten or more times, the counted value of the direction counter 42 is "0". Further, if the value of a positive (+) direction is inputted to a direction determination system 46 eight or more times to the direction counter 42, a direction determination system 46 represents a positive (+) direction state. Therefore, the direction determination system 46 represents three direction states, that is, positive (+), negative (−) and zero "0". If the direction determination system 46 represents a positive (+) direction state, and V(x) value is negative (−), the V(x) value is converted to "0" by a direction filter 44.

The flattening filter 48 is implemented as a three-stage buffer. The flattening filter 48 stores three consecutive V(x) values outputted from the direction filter 44, compares a center V(x) value with its previous and next V(x) values with reference to the direction state of the direction determination system 46, and changes the center V(x) value to a proper value on the basis of the compared result. For example, if the direction determination system 46 represents a positive (+) direction state, and consecutive V(x) values of 0, 3, 0 are inputted, the V(x) values change to 0, 1, 0. However, if the direction determination system 46 represents "0", the V(x) values change to 0, 0, 0.

If the direction determination system 46 represents a negative (−) direction state, the consecutive V(x) values of 0, 3, 0 have already changed to 0, 0, 0 by the direction filter 44 and are sent to the flattening filter 48. The following table shows a calculating procedure performed by the three-stage buffer included in the flattening filter 48.

TABLE 1

| | Three consecutive V(x) input values | | | |
|---|---|---|---|---|
| Direction Determination system | 030 031 032 033 020 021 022 023 130 131 | 132 133 | 0(−3)0 0(−3)(−1) 0(−3)(−2) 0(−3)(−3) 0(−2)0 0(−2)(−1) 0(−2)(−2) 0(−2)(−3) (−1)(−3)0 (−1)(−3)(−1) | (−1)(−3)(−2) (−1)(−3)(−3) |
| No direction state | 0 | 0 | 0 | 0 |
| Positive (+) direction state | 1 | 2 | Three V(x) values have been previously converted to 000 by the direction filter | |
| Negative (−) direction state | Three V(x) values have been previously converted to 000 by the direction filter | | −1 | −2 |
| Remark | If the direction determination system represents 0, and three consecutive V(x) values include positive (+) and negative (−) values, three values in the three-stage buffer are adjusted to allow the sum total thereof to be 0. | | | |

Table 1 shows an example in which V(x) values inputted to the filter 40, and modified V(x) values, obtained after the V(x) values go through the filter 40, are arranged. The three consecutive V(x) input values arranged in Table 1 represent values in the case where the variation between the first two values of each of the V(x) values is greater than "1". If a difference between a center V(x) value of the three-stage buffer and a V(x) value previously stored (in the last stage of the three-stage buffer) is equal to or greater than "2", the center V(x) value is adjusted such that the difference therebetween varies only to be less than or equal to "1". In this case, the adjusted value varies according to a direction state of the direction determination system 46 and a V(x) value currently inputted (to the first stage of the three-stage buffer).

For example, in Table 1, if three V(x) values which are consecutively inputted are 0 3 1, the currently inputted V(x) value is "1", the center V(x) value is "3", and the previous V(x) value is "0".

Table 1 can be summarized as follows. Provided that the direction determination system 46 represents a state not having a direction, a current state is recognized as a state when the optical mouse stops even though three consecutive V(x) values (for example, positive (+) values, such as 030, 031, 032, 033, 020, 021, 022, 023, 130, 131, 132 and 133, and negative (−) values, such as 0(−3)0, 0(−3) (−1), 0(−3) (−2), 0 (−3) (−3), 0(−2)0, 0(−2) (−1), 0(−2) (−2), 0(−2) (−3), (−1) (−1)(−3)(−1), (−1) (−3) (−2) and (−1) (−3) (−3)), are inputted. Therefore, the direction filter 44 transmits 000 to the flattening filter 48. Further, provided that the direction determination system 46 represents a positive (+) direction state, the direction filter 44 transmits "1" or "2" to the flattening filter 48 if three consecutive V(x) values are inputted to the filter 40 and the V(x) values are positive (+). Provided that the direction determination system 46 represents a positive (+) direction state, the direction filter 44 transmits 000 to the flattening filter 48 if three consecutive V(x) values are inputted and the V(x) values are negative (−). On the other hand, provided that the direction determination system 46 represents a negative (−) direction state, the direction filter 44 transmits 000 to the flattening filter 48 if three consecutive V(x) values are inputted and the V(x) values are positive (+). Moreover, provided that the direction determination system 46 represents a negative (−) direction state, the direction filter 44 transmits "−1" or "−2"to the flattening filter 48 if three consecutive V(x) values are inputted and the V(x) values are negative (−) The mapper 50 accumulates a predetermined number of motion vectors inputted from the filter 40, and outputs conversion values to attenuate noise components of the optical mouse and amplify the directionality thereof depending on the speed of the optical mouse.

V1(x) values outputted from the filter 40 are processed through a mapping operation. First, V1(x) values outputted every 588μ sec are added to each other n times, preferably, 21 times. If the added result value is Add21V1(x), the Add21V1(x) becomes 0 to ±63, because V1(x) values of 0 to ±3 are added to each other 21 times. Add21V1(x) is converted to an appropriate value by the mapping operation.

Figure 6:
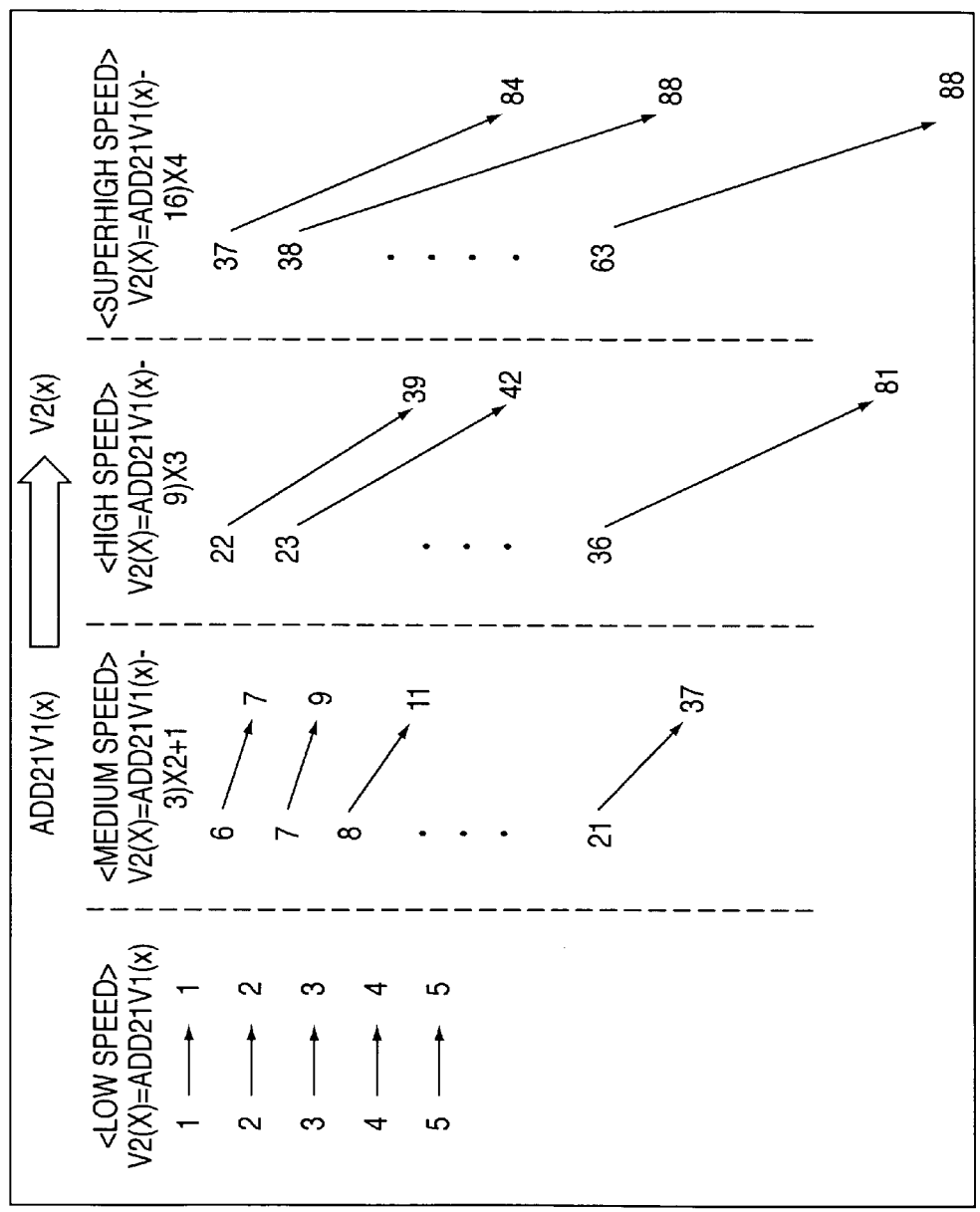
FIG. 6 is a view showing a mapping operation according to an embodiment of the present invention.

The mapping is performed such that, if the speed of the optical mouse is low (if the absolute value of Add21V1(x) is small), a V2(x) value to which Add21V1(x) is mapped increases by 1, if the speed thereof is medium, the V2(x) value increases by 2, and if the speed thereof is high (if the absolute value of Add21V1(x) is large), the value V2(x) increases by 3. By performing the mapping in this manner, motion vector values at high speed, which have fewer noise components and represent clear directionality, are sufficiently amplified, such that clearer directionality can be obtained and noise attenuation effects can also be obtained. For example, the mapping can be performed as shown in FIG. 6. That is, since V1(x) values outputted every 588μ sec are added to each other 21 times, V2(x) values obtained by the mapping are outputted every 12.348 m sec.

That is, the mapper 50 performs the mapping such that, if the absolute value of the input value Add21V1(x) is 1 to 5, that is, if the mouse speed is low, each V1(x) value is mapped to a V2(x) value obtained by adding the V1(x) values to each other 21 times. Further, if the absolute value of Add21V1(x) is 6 to 21, that is, if the mouse speed is medium, each V1(x) value is mapped to a V2(x) value obtained by adding the V1(x) values to each other 21 times, subtracting 3 from the added result value, multiplying the subtracted value by 2, and adding 1 to the multiplied value. Further, if the absolute value of Add21V1(x) is 22 to 36, that is, if the mouse speed is high, each V1(x) value is mapped to a V2(x) value obtained by adding the V1(x) values to each other 21 times, subtracting 9 from the added result value, and multiplying the subtracted value by 3. Moreover, if the absolute value of Add21V1(x) is 37 to 63, that is, if the mouse speed is superhigh, each V1(x) value is mapped to a V2(x) value obtained by adding the V1(x) values to each other 21 times, subtracting 16 from the added result value, and multiplying the subtracted value by 4.

Next, the pipe 60 stores the values mapped by the mapper 50, and transmits a value obtained by adding the plural stored values to each other and dividing the added result value by a conversion factor to the PC 30 through the PC interface 18.

The pipe 60 includes four registers, and operates such that it adds values stored in the respective registers to each other, adds a remainder of a previous calculation result to the added result value, and divides the added result value by 8, thus reducing influence due to the mapping. An equation relating to the operation of the pipe 60 is expressed by the following Equation [1].

$$\frac{\sum (A+B+C+D+E)}{8} \qquad [1]$$

Figure 7:
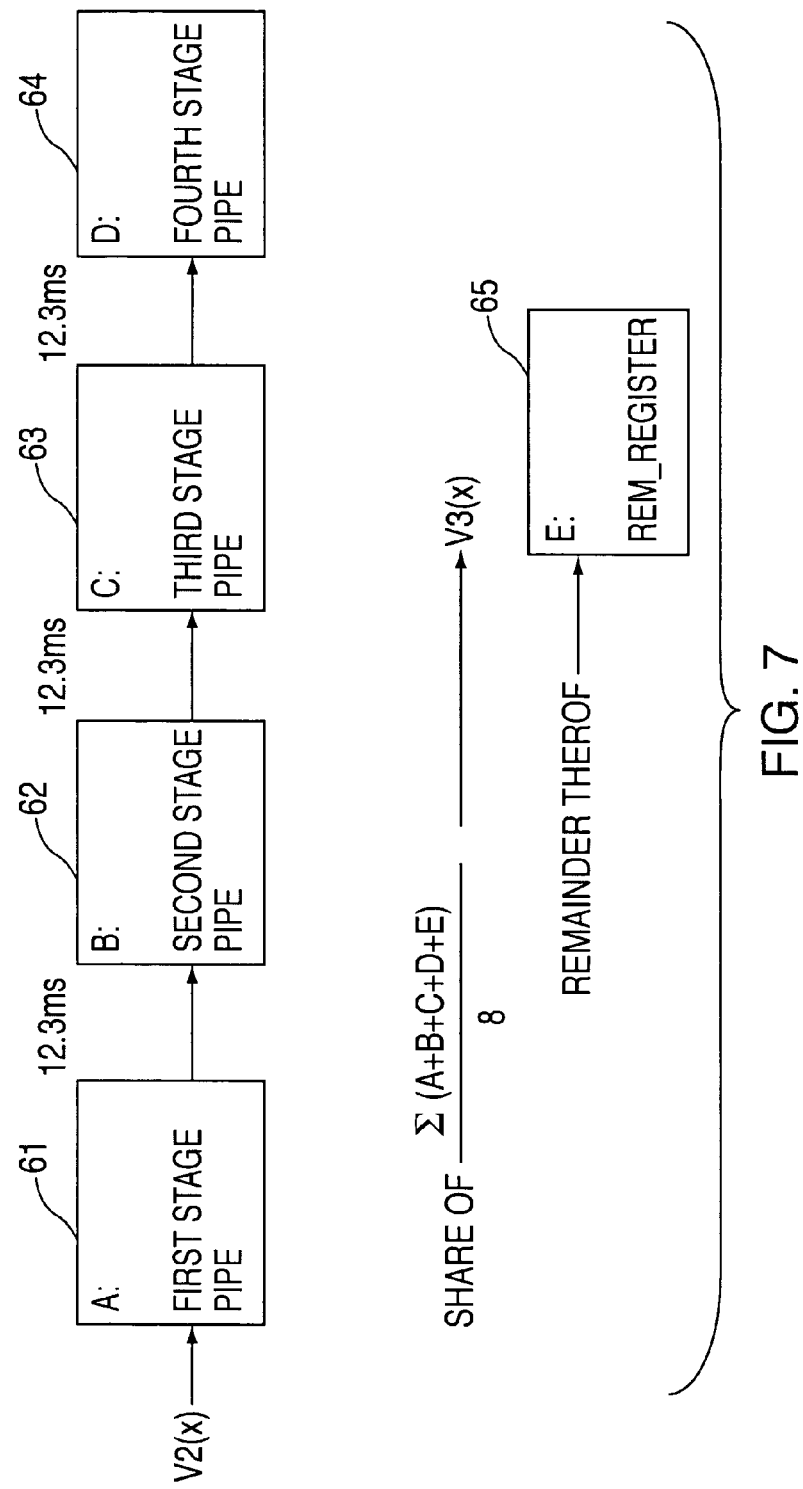
FIG. 7 is a block diagram showing a piping operation according to an embodiment of the present invention.

Each of the V2(x) values outputted from the mapper 50 through the mapping operation is converted to a V3(x) value through the pipe 60 and is sent to the PC 30. As shown in FIG. 7, the pipe 60 is comprised of four stage pipes 61 to 64. Each of the V2(x) values is shifted to a next stage and stored every 12.348 m sec, and is deleted after a fourth stage. V2(x) values at all stages and a value stored in a Rem_register are added to each other, and the added result value is divided by 8. At this time, a share of the division becomes V3(x) and is transmitted to the PC 30, while a remainder thereof is stored in the Rem-register 65. Each of the V2(x) values is outputted through the four stage pipes 61 to 64, but the output value is divided by 8, so there is an effect that only a half of the V2(x) value is converted to the V3(x).

At the mapping process, since the mapping is performed such that each motion vector value at low speed increases by 1, at medium speed by 2, and at high speed by 3, there is an effect that the motion vector at low speed is converted to increase by 0.5 times, at medium speed by 1 times, and at high speed by 1.5 times through the piping procedure. In case of low speed at which noise components of motion vectors are large relative to those at high speed, only a half of the input motion vector values are outputted to the PC, so an abnormal movement of a mouse pointer on the PC screen can be reduced.

Further, in case of high speed at which noise components of motion vectors are small relative to those at low speed, input motion vector values increase by 1.5 times and are sent to the PC, thus increasing the directionality of the mouse pointer. That is, the conversion factor of the motion vector is 0.5 at low speed and 1.5 at high speed, thus reducing abnormal operations of the mouse pointer, and obtaining the movement of the optical mouse with clear directionality. Further, the V2(x) values from the mapper are not sent at one time, but are divided and sent at four separate times, so the mouse pointer moves more softly. For example, if the V2(x) value is consecutively inputted four times as 8, 0, 0, and 0, V3(x) values transmitted to the PC through a Universal Serial Bus (USB) or PS/2 interface are 1, 1, 1, and 1, thus obtaining a smoother trajectory curve of the mouse pointer.

Figure 2A:
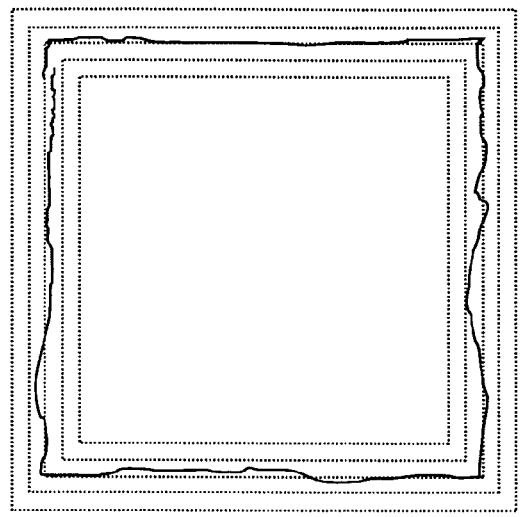
FIGS. 2a and 2b are views showing trajectories of a conventional mouse pointer displayed on a PC screen.
Figure 2B:
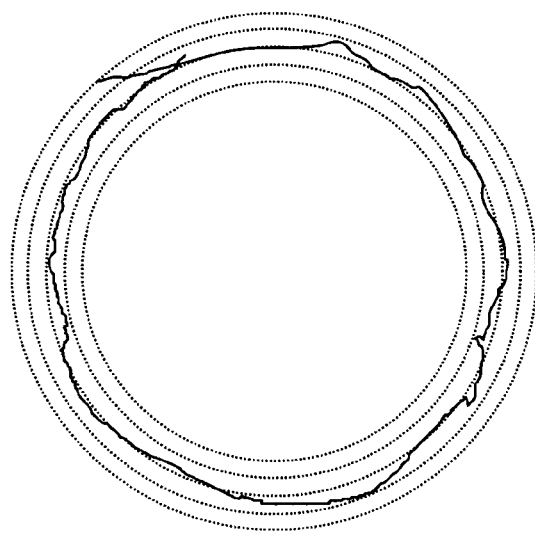
Figure 8A:
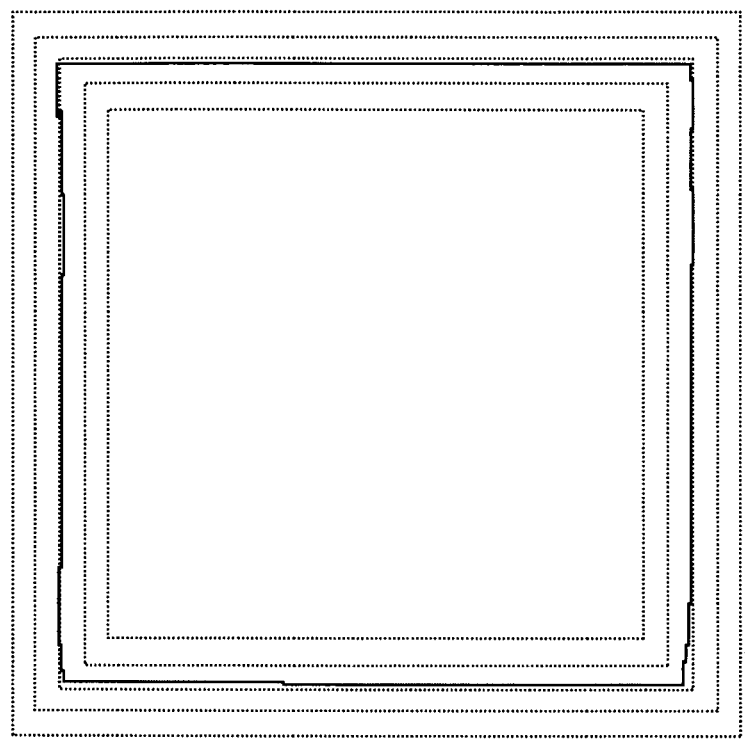
FIG. 8 is a view showing a trajectory curve of a mouse pointer displayed on a PC screen after the motion vector processing is carried out according to the present invention.
Figure 8B:
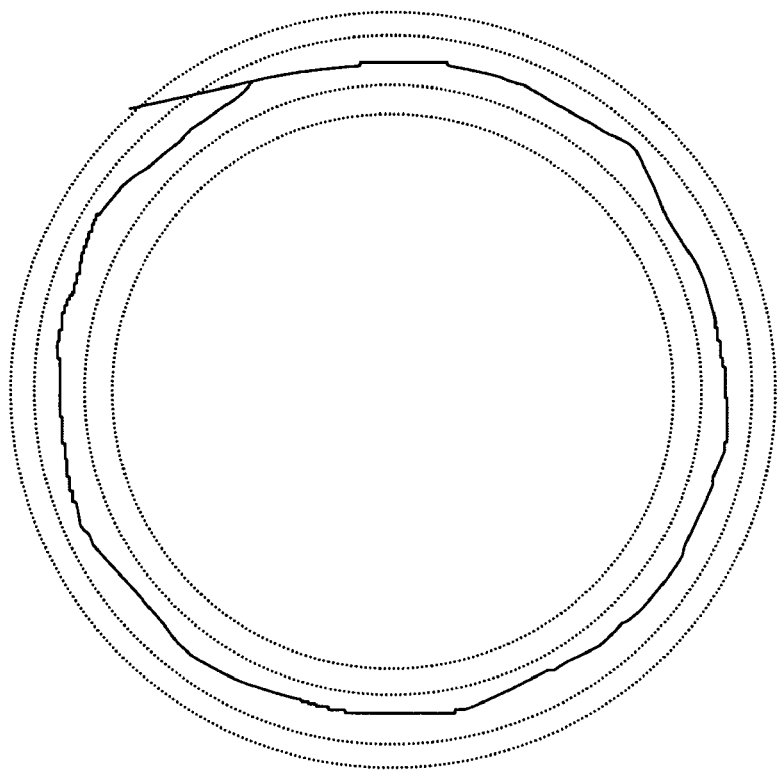

As described above, it can be seen that the trajectories of the mouse pointer obtained through the motion vector processing unit proposed in the present invention are softer than those of a conventional mouse pointer shown in FIGS. 2a and 2b, by referring to a trajectory of the mouse pointer obtained when a rectangle is drawn by the optical mouse as shown in FIG. 8a, and a trajectory thereof obtained when a circle is drawn by the optical mouse as shown in FIG. 6b.

As described above, the present invention provides a method for processing image data of an optical mouse, which outputs values obtained by filtering, mapping and piping consecutively inputted motion vectors (movement coordinates) of the optical mouse with respect to X and Y axes to a PC through a PC interface (USB or PS/2), thus minimizing noise components of the optical mouse, and consequently ensuring the unnatural movement of a cursor on a PC screen. Further, the present invention is advantageous in that it can also be applied to other kinds of mice as well as optical mice.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for processing image data of an optical mouse, comprising the steps of:
   filtering motion vectors which are image data consecutively inputted from an image pixel array with respect to X and Y axes by a filter according to the direction and size;
   accumulating a predetermined number of motion vectors converted by and outputted from the filter, and mapping the accumulated values to conversion values to attenuate noise components and amplify directionality of the motion vectors depending on a speed of the optical mouse by a mapper; and
   transmitting a value obtained by adding the plural values to each other which are stored in a plurality of pipes and dividing the added result value by a conversion factor to a personal computer (PC) interface.

2. The image data processing method of an optical mouse according to claim 1, wherein said filter for filtering comprises:
   a direction counter for accumulating direction values of a set of motion vectors;
   a direction determination system for determining a direction by checking the direction values accumulated in the direction counter;
   a direction filter for determining motion vector values according to the direction values accumulated in the direction counter and the direction determined by the direction determination system; and
   a flattening filter for storing the motion vector values determined by the direction filter, comparing a center motion vector value with its previous and next values with reference to direction determined by the direction determination system, and changing output values of the flattening filter to corresponding values on the basis of the compared result.

3. The image data processing method of an optical mouse according to claim 2, wherein:
   said direction determination system represents a state not having a direction, a positive (+) direction state and a negative (−) direction state;
   if the direction determination system represents the positive (+) direction state, a negative (−) input value (motion vector value) changes to 0;
   if the direction determination system represents the negative (−) direction state, a positive (+) input value (motion vector value) changes to 0; and
   the flattening filter changes a sudden variation (equal to or greater than ±2) of the motion vector to a variation less than or equal to 1, and the changed value is differently processed depending on a state of the direction determination system.

4. The image data processing method of an optical mouse according to claim 1, wherein said mapper classifies a sum of 15 to 30 consecutive input values into low, medium and high speeds, and operates such that a mapped value increases by 1 at the low speed, by 2—at the medium speed, and by 3 at the high speed.

5. The image data processing method of an optical mouse according to claim 4, wherein said mapper performs a mapping operation using a mapping equation constructed to connect boundaries of the values for low, medium and high speeds to each other.

6. The image data processing method of an optical mouse according to claim 1, wherein said pipes are implemented using 3 to 6 registers, and operate such that the pipes add values stored in the registers to each other, add a remainder of a previous calculation result to the added result value, and divide the added result value by 8, thus reducing influence due to the mapping operation.

7. The image data processing method of an optical mouse according to claim 6, wherein said pipes operate such that they transmit a share of a value obtained by dividing the added result value by 8 to the PC, and store a remainder thereof in a register.

8. The image data processing method of an optical mouse according to claim 1 wherein said PC interface is one of a Universal Serial BUS (USB) and a PS/2 interface.

* * * * *